US012108885B2

(12) United States Patent
Qi

(10) Patent No.: US 12,108,885 B2
(45) Date of Patent: Oct. 8, 2024

(54) CONTROL PANEL FOR A MULTIFUNCTIONAL CUP HOLDER AND SOFA SEAT

(71) Applicant: HUIZHOU UPSPRING INTELLIGENT TECHNOLOGY CO., LTD., Huizhou (CN)

(72) Inventor: Fayun Qi, Huizhou (CN)

(73) Assignee: HUIZHOU UPSPRING INTELLIGENT TECHNOLOGY CO., LTD., Guangdong (CN)

( * ) Notice: Subject to any disclaimer, the term of this patent is extended or adjusted under 35 U.S.C. 154(b) by 291 days.

(21) Appl. No.: 17/678,839

(22) Filed: Feb. 23, 2022

(65) Prior Publication Data

US 2023/0263309 A1 Aug. 24, 2023

(51) Int. Cl.

| | |
|---|---|
| ***A47C 7/62*** | (2006.01) |
| ***A47C 1/034*** | (2006.01) |
| ***A47C 1/036*** | (2006.01) |
| ***A47C 7/72*** | (2006.01) |
| *H01R 13/66* | (2006.01) |
| *H01R 24/76* | (2011.01) |

(52) U.S. Cl.

CPC ............ *A47C 7/624* (2018.08); *A47C 1/0342* (2013.01); *A47C 1/036* (2013.01); *A47C 7/723* (2018.08); *A47C 7/725* (2013.01); *H01R 13/6675* (2013.01); *H01R 24/76* (2013.01)

(58) Field of Classification Search

None

See application file for complete search history.

(56) References Cited

U.S. PATENT DOCUMENTS 5,846,091 A * 12/1998 Nishijima .......... H01R 13/6658 174/72 A
6,034,688 A * 3/2000 Greenwood .......... G06F 3/0489 715/804
2003/0052514 A1* 3/2003 Schmidt ................. B60K 35/10 296/153
2004/0016847 A1* 1/2004 Ritts .................... B64D 11/003 244/118.5
2007/0035955 A1* 2/2007 Puschmann ............ B64D 11/06 362/472

(Continued)

FOREIGN PATENT DOCUMENTS

CN 214905294 U * 11/2021 ............. A47C 7/541

*Primary Examiner* — David E Allred
(74) *Attorney, Agent, or Firm* — Arch & Lake LLP

(57) ABSTRACT

The present disclosure provides a control panel for a multifunctional cup holder installed on a reclining sofa and a sofa thereof. The control panel includes: a plurality of buttons operatively connected to a powered reclining mechanism of an extendable seat, and the plurality of buttons are configured to control the powered reclining mechanism of the extendable seat to move among different positions; a light switch button operatively connected with a light source, the light source is disposed inside a cupholder that is placed on an armrest on the extendable seat; a power supply port, and the power supply port is configured to provide power to an external electronic device; a panel body including two sides; and a circuit board disposed in the panel body, the circuit board is electronically connected with the plurality of buttons, the light switch and the power supply port.

18 Claims, 6 Drawing Sheets

(56) References Cited

U.S. PATENT DOCUMENTS

| | | | | |
|---|---|---|---|---|
| 2007/0232460 | A1* | 10/2007 | Nguyen | A63B 21/00178 482/92 |
| 2010/0219055 | A1* | 9/2010 | Wada | H01H 3/60 200/336 |
| 2012/0217772 | A1* | 8/2012 | Tang | A47C 7/68 62/3.2 |
| 2012/0280544 | A1* | 11/2012 | Wiley | A47C 7/72 297/188.14 |
| 2015/0091389 | A1* | 4/2015 | Byrne | A61B 5/6891 307/104 |
| 2018/0271287 | A1* | 9/2018 | Jacobs | A47C 1/124 |
| 2020/0100594 | A1* | 4/2020 | Fietz | A47C 7/541 |
| 2021/0053512 | A1* | 2/2021 | Perona | G06F 3/044 |
| 2021/0059417 | A1* | 3/2021 | Wu | A47C 7/624 |
| 2021/0112341 | A1* | 4/2021 | Nelson | A47C 13/005 |
| 2021/0235874 | A1* | 8/2021 | Rafieha | A47C 7/72 |
| 2022/0055751 | A1* | 2/2022 | Hansson | B64D 11/0624 |
| 2022/0061537 | A1* | 3/2022 | Qi | A47C 7/622 |
| 2022/0273105 | A1* | 9/2022 | Liu | A47C 7/748 |
| 2022/0408925 | A1* | 12/2022 | Rafieha | A47C 7/624 |
| 2023/0022026 | A1* | 1/2023 | Koh | B60N 2/0228 |

* cited by examiner

CONTROL PANEL FOR A MULTIFUNCTIONAL CUP HOLDER AND SOFA SEAT

TECHNICAL FIELD

The present disclosure relates to the technical field of control panels, specifically, to a control panel for a multi-functional cup holder installing on a reclining sofa and a sofa thereof.

BACKGROUND

With the general quality of life improved in the modern society, people now seek furniture that brings greater comfort. Some sofas or seating units are of reclining functions. If the users need to adjust the positions of the sofa to make it feel more comfortable, the users may manually push a button or pull a lever on the side to control the mechanical parts of the sofa.

SUMMARY

The present provides a control panel, an extendable seat with the control panel, and a manufacturing method of the control panel.

The first aspect of the present disclosure provides a control panel for installation on a sofa. The control panel includes: a plurality of buttons operatively connected to a powered reclining mechanism of an extendable seat, where the plurality of buttons are configured to control the powered reclining mechanism of the extendable seat to move among different positions; a light switch button operatively connected with a light source, where the light source is disposed inside a cupholder that is placed on an armrest on the extendable seat, and the light switch button is configured to control the light source; a power supply port, where the power supply port is configured to provide power to an external electronic device; a panel body including two sides, where a first side of the panel body is fixedly attached to the armrest of the extendable seat, a second side of the panel body is opposite to the first side of the panel body, and the plurality of buttons, the light switch button and the power supply port are disposed on the second side of the panel body; and a circuit board disposed in the panel body, where the circuit board is electronically connected with the plurality of buttons, the light switch and the power supply port. The control panel is disposed on the armrest of the extendable seat next to the cupholder separately, and the control panel is electronically connected to the cupholder, and one side of the control panel is curved to accommodate circumference of the cupholder.

In the second aspect of the present disclosure, an extendable seat including the control panel is provided. The extendable seat includes: a seat body with an armrest, a powered reclining mechanism, and a control panel disposed on the armrest, where the control panel is configured according to the first aspect of the present disclosure.

In the third aspect of the present disclosure, a method of manufacturing a control panel is provided. The method includes connecting a plurality of buttons operatively to a powered reclining mechanism of an extendable seat, where the plurality of buttons are configured to control the powered reclining mechanism of the extendable seat to move among different positions; connecting a light switch button operatively with a light source, where the light source is disposed inside a cupholder that is placed on an armrest on the extendable seat, and the light switch button is configured to control the light source; providing a power supply port, where the power supply port is configured to provide power to an external electronic device; providing a panel body including two sides, and fixedly attaching a first side of the panel body to the armrest of the extendable seat, where a second side of the panel body is opposite to the first side of the panel body, and the plurality of buttons, the light switch button and the power supply port are disposed on the second side of the panel body; and placing a circuit board in the panel body, and electronically connecting the circuit board with the plurality of buttons, the light switch and the power supply port. The control panel is disposed on the armrest of the extendable seat next to the cupholder separately, and the control panel is electronically connected to the cupholder, and one side of the control panel is curved to accommodate circumference of the cupholder.

It is to be understood that both the foregoing general description and the following detailed description are exemplary and explanatory only and are not restrictive of the present disclosure.

BRIEF DESCRIPTION OF THE DRAWINGS

The drawings described here are used to provide a further understanding of the present disclosure and constitute a part of the present disclosure. The examples and descriptions of the present disclosure are used to explain the present disclosure, and do not constitute an improper limitation of the present disclosure.

DETAILED DESCRIPTION

The present disclosure is described with reference to examples and corresponding drawings. The described examples are only part but not all of the examples of the present disclosure. Based on the examples in the present disclosure, all other examples obtained by those ordinary skilled in the art without any inventive work belong to the protection scope of the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

The description of numerals used in this disclosure may include: 1. Control panel, 2. Buttons; 21. First group of buttons; 22. Second group of buttons; 23. Third group of buttons; 3. Light switch button; 4. Power supply port; 5. Panel body; 51. Backside of the panel body; 52. Front side of the panel body; 6. Circuit board; 7. Cupholder; 8. Wires.

Figure 1:
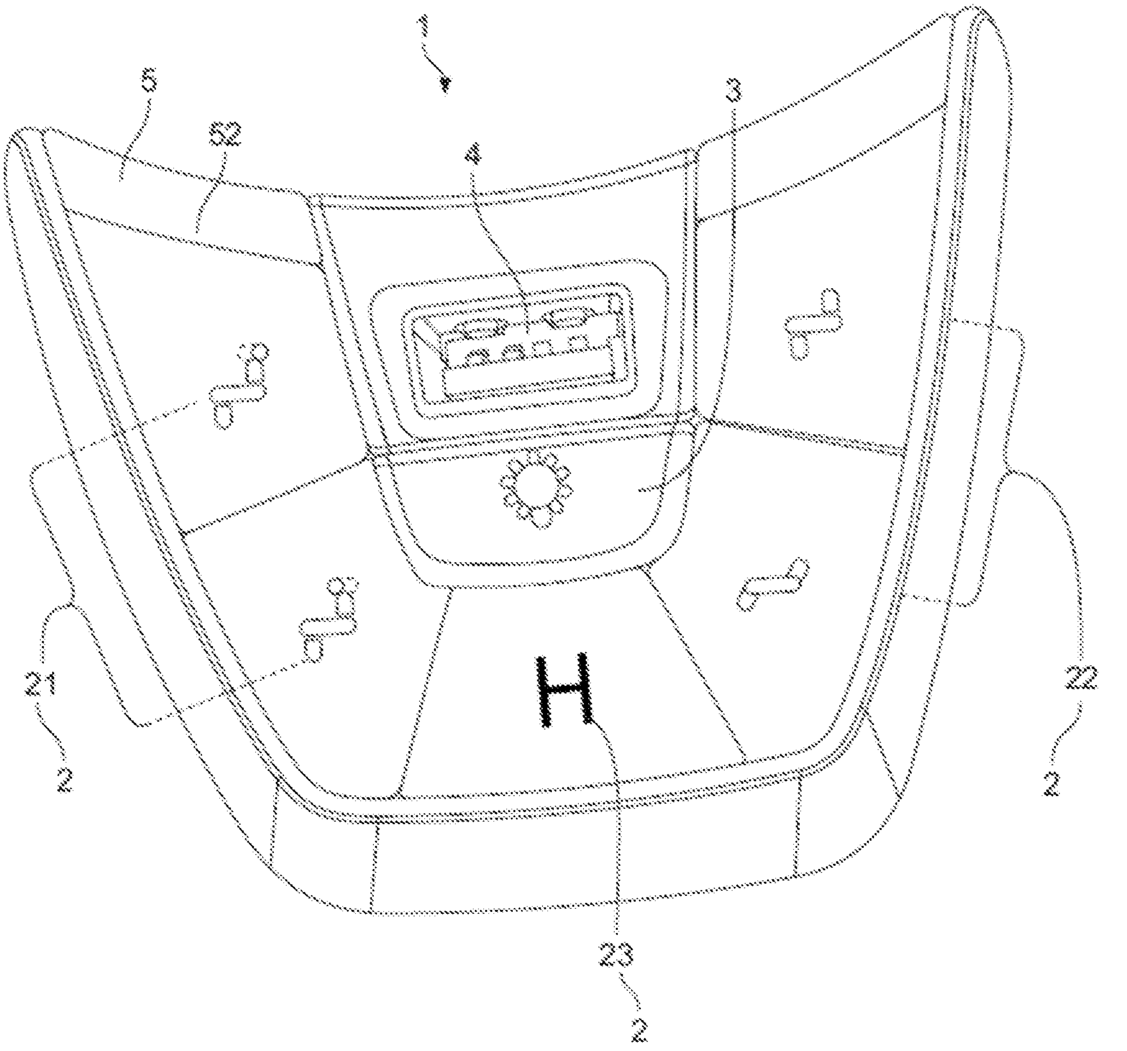
FIG. 1 is a schematic structural diagram of a control panel in accordance with one or more examples of the present disclosure.

FIG. 1 is a schematic structural diagram of a control panel in accordance with one or more examples of the present disclosure. In some examples according to the present disclosure, the control panel 1 includes multiple buttons 2. The buttons 2 may include a first group of buttons 21, a second group of buttons 22, and a third group of buttons 23. The buttons 2 are disposed on one side of the control panel 1. The buttons 2 may be connected with a reclining sofa or seating unit by wires. More specifically, the buttons 2 may be operatively connected to a powered reclining mechanism of the reclining sofa or the seating unit. Such that, once connected and in the operation mode, the buttons 2 are configured to control the powered reclining mechanism of the sofa or seating unit to move among different positions. For examples, a user may press to the buttons 2 to convert the sofa from a fully reclined position to an upright sitting position, or vice versa.

In some examples, the buttons 2 include a first group of buttons 21, a second group of buttons 22, and a third group of buttons 23. The first group of buttons 21 may include two or more buttons that are operatively connected to a headrest portion of the powered reclining mechanism. The first group of buttons 21 are configured to control the movement of the headrest of the sofa or the seating unit. For example, one of the first group of buttons 21 may control the headrest to recline forward toward the seating portion of the sofa, and the other one of the first group of buttons 22 may control the headrest to recline away from the seat of the sofa. A user may adjust relative angle between the headrest and the backrest of the sofa or seating unit by pressing the first group of buttons 21.

The second groups of buttons 22 may also include two or more buttons in accordance with some examples of the present disclosure. The second group of buttons 22 are operatively connected with the powered reclining mechanism, and these second group of buttons 22 are programmed to control the sofa to move between different positions, such as a fully reclined position, an upright sitting position, etc. In one example, the user may press one of the second group of buttons 22 to have the sofa or the seating unit gradually convert back to the upright sitting position. When the user would like to lying back, he may press another button 22 to have the sofa gradually reclined until it reached the fully reclined position.

The third group of buttons 23 may include one or more buttons in accordance with some examples of the present disclosure. The third group of buttons 23 may be programmed to provide the user with some shortcut controls to the reclining mechanism and the sofa. For examples, the buttons 23 may be programed to control the reclining mechanism to move just between the fully reclined position and the upright sitting position. When in the fully reclined position, the user may press the third group of buttons 23 once and have the sofa or the seating unit move back to the upright sitting position directly. Alternatively, the user may just press button 23 once to convert the sofa or the seating unit from the upright sitting position to the fully reclined position.

In some examples according to the present disclosure, the control panel 1 also includes a light switch button 3. The light switch button 3 may be disposed next to the plurality of buttons 2 on the front side 52 of the control panel body 5. In some examples, the light switch button 3 is operatively connected to the light sources disposed in the cupholder, and the light switch button 3 is configured to control the on/off of the light sources. The light sources may be placed inside the cupholder on an armrest of the sofa or the seating unit. Alternatively, such light sources may be placed around the cupholders. The light sources may assist users to locate the cupholder easily in the dark.

In some other examples, the control panel may include lighting sources placed directly on it. For instance, a light source may be placed on a front side of the control panel body next to or in the center of the plurality of buttons 2. When the light source is in operation, it may provide guidance for the users to locate the buttons and other parts of the control panel in a dark environment. In some other examples, a light source may also be provided around the buttons, such as a circular light component in a shape corresponding to the shapes of the buttons and placed around the circumferences of the buttons. The light switch button 3 may be operatively connected to control the operations, the on/off, of these light sources on the control panel in accordance with some examples of the present disclosure.

A power supply port 4 is disposed on the control panel 1 in some examples of the present disclosure. The power supply port 4 is configured to connect with an external electronic device, and supply power to charge the connected device. The power supply port 4 may be placed next to the power switch button 3. In some examples, the power supply port 4 is placed in the central part of the control panel, and the plurality of buttons 2 may be placed around the power supply port 4. The power supply port 4 may be a USB port, a Type-C port, or other types of connection port that are commercially available. The power support port 4 may include one or more ports for connecting more than one external electronic devices.

The panel body 5 provides the main frame for the control panel 1, and the other parts of the control panel are placed on or connected with the panel body. The panel body 5 consists of at least two sides, a front 52 side of the panel body, and a back side 51 of the panel body. The front side 52 and the back side 51 are opposite to each other. In some examples, the buttons 2, the light switch button 3, and the power supply port 4 are disposed on the front side 52 of the panel body.

Figure 2:
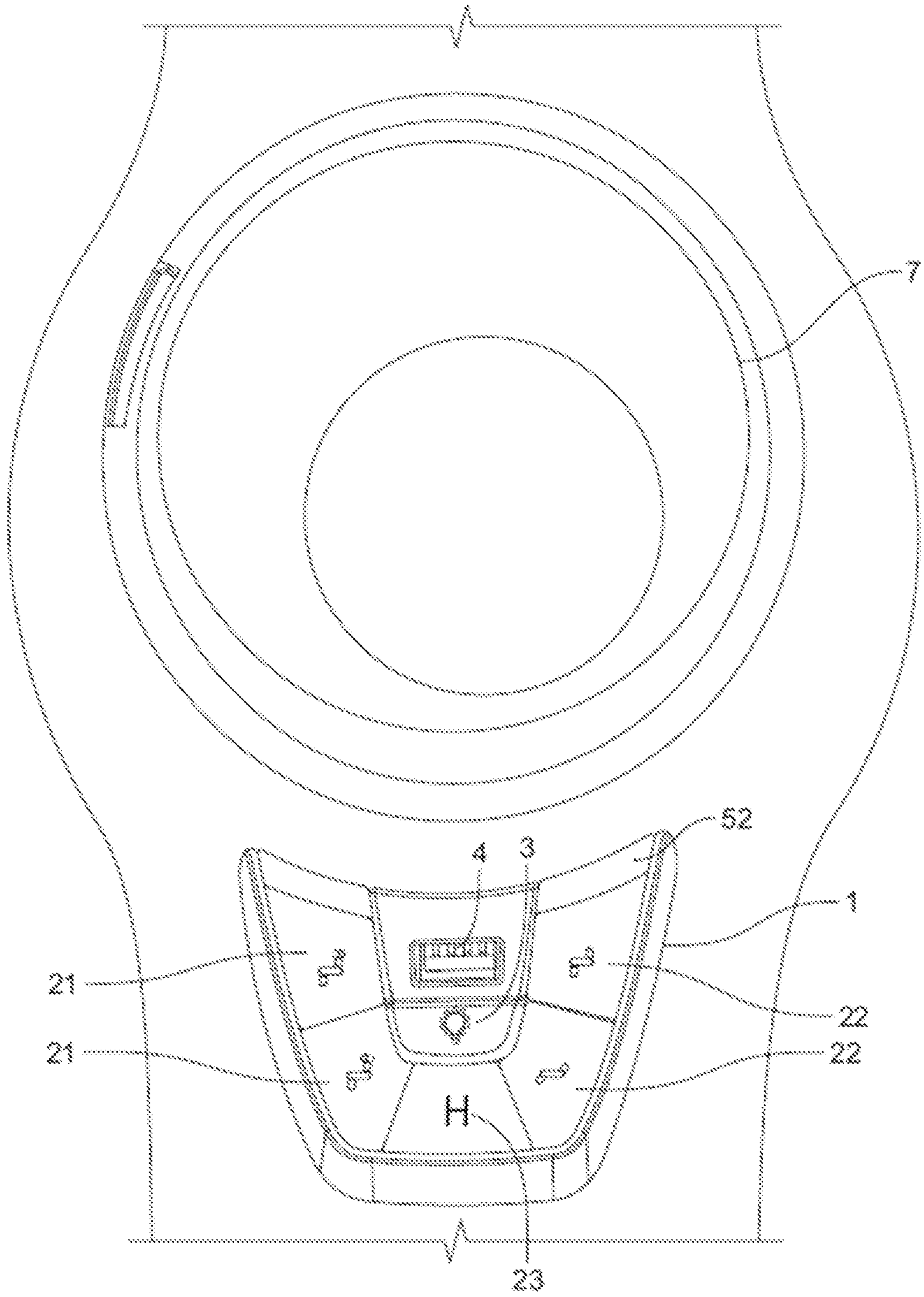
FIG. 2 is a schematic structural diagram of a control panel installed next to a cupholder in accordance with one or more examples of the present disclosure.

As shown in FIG. 1, a top view of the front side 52, the panel body is approximately in a trapezoid shape. The first group of buttons 21 and the second group of buttons 22 are placed along two opposite sides of the trapezoid panel body 5. One third group of buttons 23 is placed along the bottom base of the trapezoid panel body 5. The power supply port 4 is placed close to the upper base of the trapezoid panel body 5. In such example, the power supply port is placed closer the upper base of the panel body, and is closer to the cupholder for more convenient user experience. The light switch button 3 is placed in the central area of the panel body 5, and is surrounded by the first group of buttons 21, the second group of buttons 22, the third group of buttons 23, and the power supply port 4. FIG. 2 is a top view of the control panel installed on an armrest of a sofa next to a cupholder. As illustrated in FIG. 2, in some examples, the upper base of the trapezoid panel body 5 is of a concave curve, and the curved design of the panel body may correspond to the circumference of the cupholder. Such that the control panel may be installed closely next to the cupholder. The panel body 5 may be constructed by connecting several pieces of panels together. For example, the panel body 5 may include three different sections, such as one panel section for placing the plurality of buttons 2, one panel section for placing the light switch button 3, and the other one panel section for installing the power supply port 4. In another example, the panel body may be constructed as one integrated piece, and the panel body include only one section for placing all different components.

The back side 51 of the panel body is opposite to the front side 52. When installed on a sofa or seating unit, the back side 52 of the panel body is fixedly attached to an armrest of the sofa or the seating unit.

In some examples, the control panel 1 also includes a circuit board 6. The circuit board 6 may be disposed inside the panel body 5, or the circuit board 6 may be electronically connected to the backside 51 of the panel body 5. The circuit board is electronically connected with the plurality of buttons 2, the light switch button 3 and the power supply port 4. The circuit board 6 may be programmed to control the operations of the various buttons and power supply port.

Figure 3:
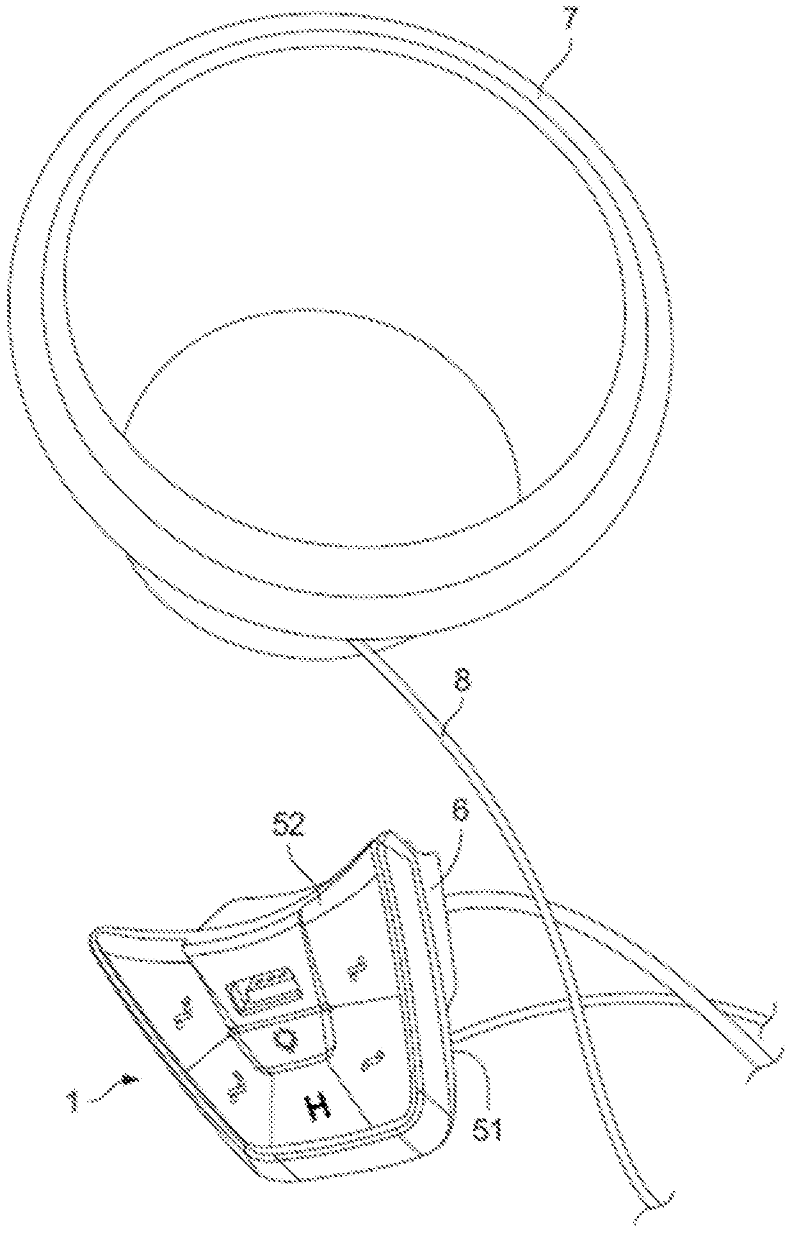
FIG. 3 is a schematic structural diagram of a control panel that is connected with a cupholder in accordance with one or more examples of the present disclosure.

FIG. 3 is another schematic structural diagram of a control panel that is connected with a cupholder in accordance with some examples of the present disclosure. As illustrated in FIG. 3, the control panel 1 is operatively connected with the cupholder 7 by wires 8. Once installed on a sofa or a seating unit, the control panel 1 is placed on the armrest of the sofa or the seating unit next to the cupholder separately. The control panel 1 is electronically connected to the cupholder with wires 8. One side of the control panel is curved to accommodate circumference of the cupholder. When installed on the armrest of the sofa, the level of front surface of the control panel 1 may be a bit higher the surface of the armrest for easy and quick installation. In such cases, it may also be easier for the users to locate the control panel. While in some other examples, the control panel 1 may be embedded to the armrest of the sofa, such that the level of the upper surface of the control panel remains the same as the level of the armrest surface. It may be aesthetically appealing in some cases.

In some examples of the present disclosure, the plurality of buttons 2 include one control button that is operatively connected with wires to move the powered reclining mechanism of the extendable seat between a fully reclined position and an upright sitting position.

In some examples, the plurality of buttons 2 include a group of buttons that are connected to control a backrest and a footrest of the extendable seat to move among different positions.

In some examples, the plurality of buttons 2 include a group of buttons that are connected to control a headrest of the extendable seat to move among different positions.

In some examples, the power supply port 4 may include a USB port, a USB-C port, or a lightning port for connecting the external electronic device.

In some examples, the control panel 1 is connected with the cupholder wirelessly or with wires 8 to control operations of the cupholder.

In some examples, the control panel 1 may include a connection port 4 for connecting an external electronic device. The plurality of buttons 2 may be configured to control operations of the external electronic device that is connected through the connection port.

In some examples, the control panel 1 may also include a LED display to show a current position of the extendable seat, adjustment options for the extendable seat, adjustment options for the cupholder, or adjustment options for the external electronic device that is connected to the control panel.

In some examples, the control panel 1 may also include a heat panel, and the heat panel is configured to heat the control panel and to control surface temperature of the plurality of buttons on the control panel.

In some examples, the control panel 1 may also include a wireless charging panel for wirelessly connecting and charging an external electronic device.

Figure 4:
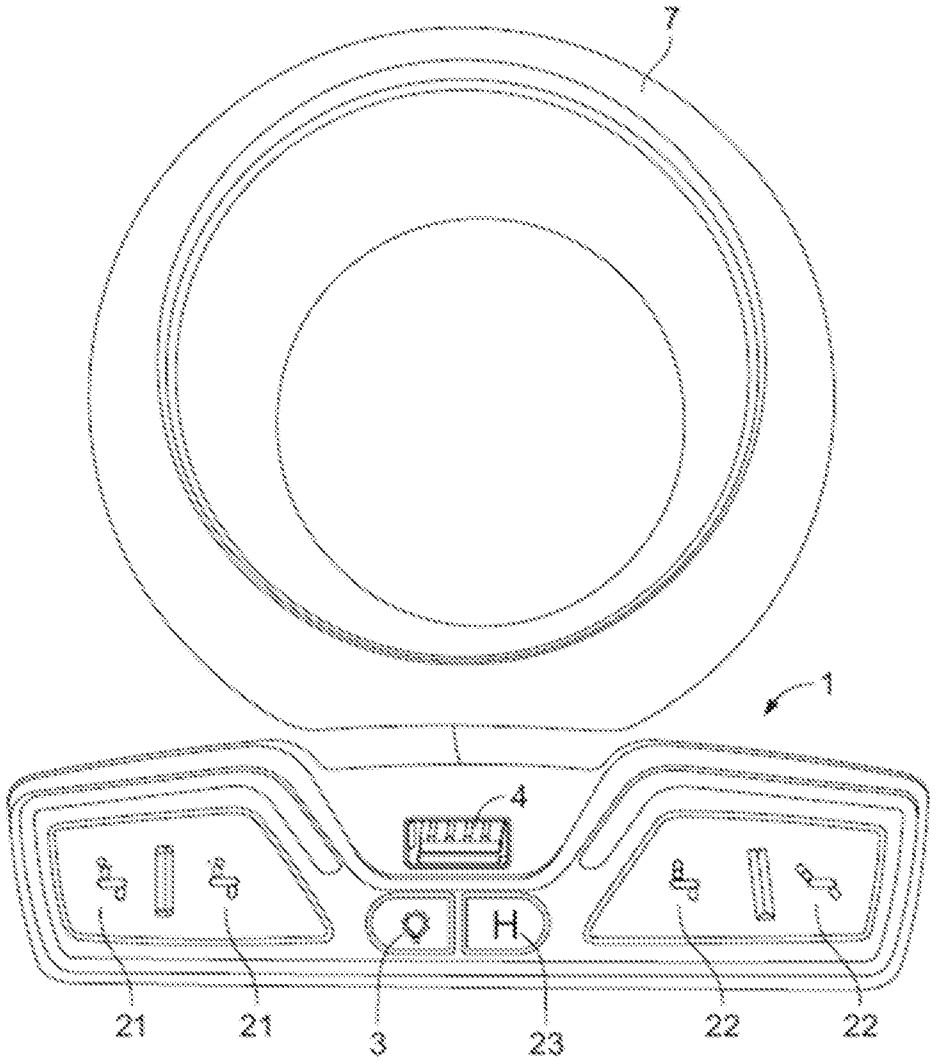
FIG. 4 is a schematic structural diagram of a control panel installed next to a cupholder in accordance with one or more examples of the present disclosure.

FIG. 4 illustrates a control panel in accordance with another example of the present disclosure. The control panel 1, as shown in FIG. 4, is installed next to a cupholder 7, and is configured to control the operations of the cupholder and the sofa that they are attached to. In some examples, the panel body 5 approximately is of a rectangular shape. One of the two longer sides of the rectangular panel body may be curved, or of irregular shape to provide more space for placing the buttons or other parts on the control panel.

The panel body 5 provides the main frame for the control panel 1, and the other parts of the control panel are placed on or connected with the panel body. The panel body 5 consists of at least two sides, a front 52 side of the panel body, and a back side 51 of the panel body. The front side 52 and the back side 51 are opposite to each other. The buttons 2, the light switch button 3, and the power supply port 4 are disposed on the front side 52 of the panel body. In some examples, the buttons 2, the light switch button 3, and the power supply port 4 are disposed along the length of the panel body 5.

In some examples according to the present disclosure, the buttons 2 may include a first group of buttons 21, a second group of buttons 22, and a third group of buttons 23. In a top view of the control panel 1, as shown in FIG. 4, the first 21 and the second group 22 of buttons may be disposed on two opposite ends of the panel body, along the length of the panel body. The third group of buttons 23 and the light switch button 3 are placed in between the first and the second group of buttons. The power supply port 4 is located above the light switch button 3 and the third group of buttons 23 in the central part of the panel body.

The buttons 2 may be connected with a reclining sofa or seating unit by wires. More specifically, the buttons 2 may be operatively connected to a powered reclining mechanism of the reclining sofa or the seating unit. Such that, once connected and in the operation mode, the buttons 2 are configured to control the powered reclining mechanism of the sofa or seating unit to move among different positions. For examples, a user may press to the buttons 2 to convert the sofa from a fully reclined position to an upright sitting position, or vice versa.

Figure 5:
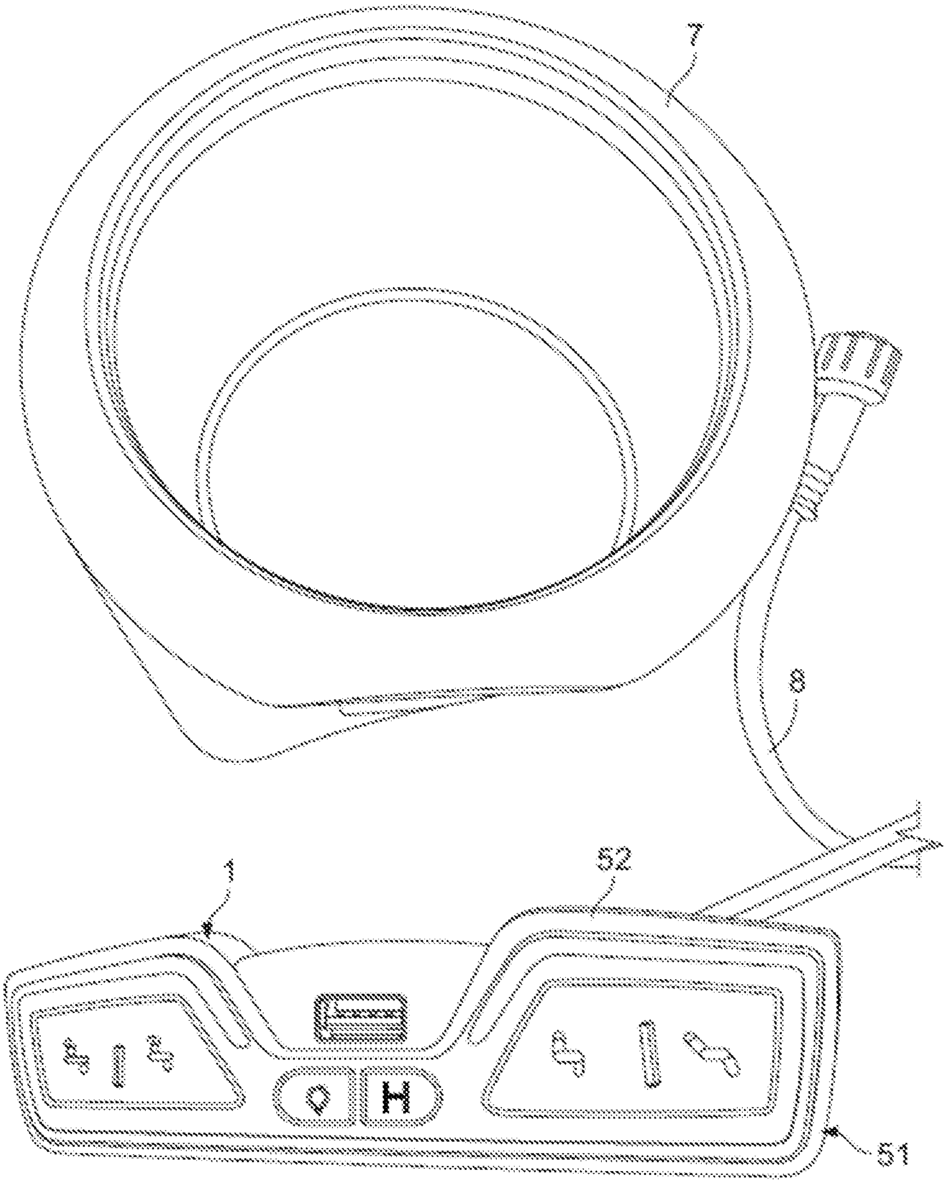
FIG. 5 is a schematic structural diagram of a control panel that is connected with a cupholder in accordance with one or more examples of the present disclosure.

FIG. 5 another schematic structural diagram of a control panel that is connected with a cupholder in accordance with some examples of the present disclosure. As shown in FIG. 5, the control panel 1 is operatively connected with the cupholder 7 by wires 8. Once installed on a sofa or a seating unit, the control panel 1 is placed on the armrest of the sofa or the seating unit next to the cupholder separately. The control panel 1 is electronically connected to the cupholder with wires 8, and the control panel is configured to control the operations of the cupholder 7 and the reclining mechanism of the sofa or the seating unit.

Figure 6:
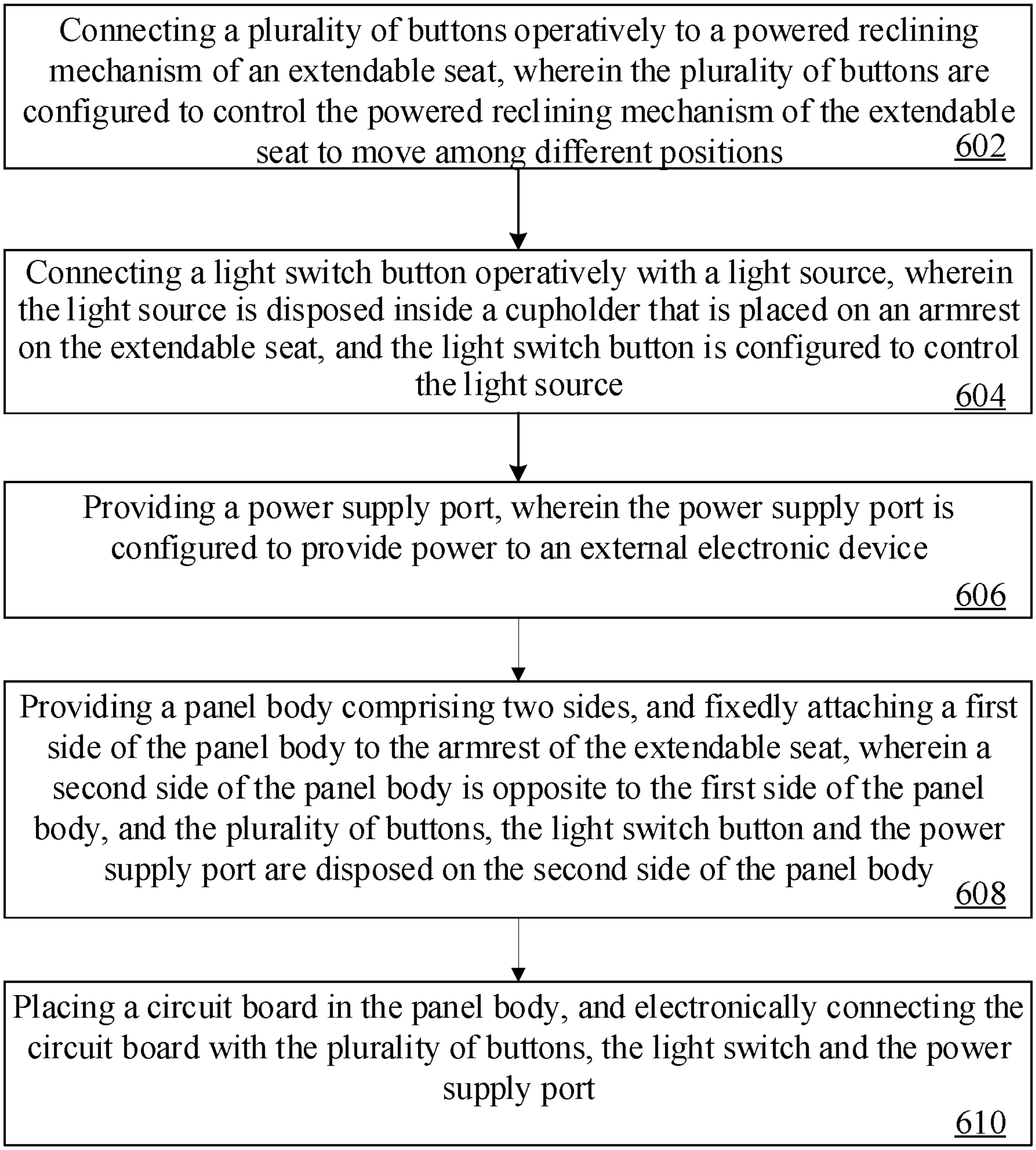
FIG. 6 is a flow chart illustrating a method for manufacturing the control panel, according to some examples of the present disclosure.

In another aspect of the present disclosure, a method of manufacturing the above-described control panel is provided. As shown in FIG. 6, the process of manufacturing such control panels may include the following steps.

In Step 602, multiple buttons are operatively connected to a powered reclining mechanism of an extendable seat. Such multiple buttons are configured to control the powered reclining mechanism of the extendable seat to move among different positions.

In Step 604, a light switch button is operatively connected with a light source. Such light source is disposed inside a cupholder that is placed on an armrest on the extendable seat, and the light switch button is configured to control the light source.

In Step 606, a power supply port is provided on the control panel, and the power supply port is configured to provide power to an external electronic device.

In Step 608, a panel body is provided, and the panel body includes two sides. The first side of the panel body is fixed attached to the armrest of the extendable seat. The second side of the panel body is opposite to the first side of the panel body, and the plurality of buttons, the light switch button and the power supply port are disposed on the second side of the panel body.

In Step 610, a circuit board is placed in the panel body. the circuit board is electronically connected with the plurality of buttons, the light switch and the power supply port.

In some examples according to the present disclosure, the control panel is disposed on the armrest of the extendable seat next to the cupholder separately, and the control panel is electronically connected to the cupholder, and one side of the control panel is curved to accommodate circumference of the cupholder.

In some examples, the manufacturing method further includes providing one control button operatively connected to move the powered reclining mechanism of the extendable seat between a fully reclined position and an upright sitting position.

In some other examples, the manufacturing method further includes providing a first group of buttons operatively connected to control a backrest and a footrest of the extendable seat to move among different positions; and providing a second group of buttons operatively connected to control a headrest of the extendable seat to move among different positions.

In yet another example, the manufacturing method may further include providing a connection port for connecting an external electronic device, wherein the plurality of buttons are configured to control operations of the external electronic device that is connected through the connection port.

In yet another example, the manufacturing method may further include providing a LED display to show a position of the extendable seat, adjustment options for the extendable seat, adjustment options for the cupholder, or adjustment options for the external electronic device that is connected to the control panel.

The present disclosure also provides a sofa or an extendable seating unit that includes the control panel for a multifunctional cup holder. The sofa may include a sofa body with various seating structures, a multifunctional cup holder, and a control panel as disclosed in the above examples installed on the sofa arms.

In some examples, the sofa or the extendable seat may include a seat body with an armrest, a powered reclining mechanism, and a control panel disposed on the armrest.

The control panel and the multifunctional cup holder in the present disclosure, by setting the control panel separately next to the cup holder, may not only allow users to put canned drinks on the cup holder, but also enable users to adjust the position of the sofa to a comfortable state according to personal needs. The design may also allow for convenience and flexibility. At the same time, the control panel 1 and the cup holder 7 are built as separate bodies to facilitate the stable installation and removal on the sofa. Through the USB port and the audio port, mobile phones, computers, etc. can be charged, and a user can connect audio devices to the sofa. Channel can be used to hide and protect the wires connected to external devices. The light guide plate in the cup holder can emit light with the assistance of external light sources, so that users can find the cup holder and the control panel in a dark environment. By placing the inner cup inside the cup body, canned drinks can be placed on the inner cup for the ease of cleaning and moisture resistance. The inner cup can also be used as an ashtray. Meanwhile, the inner cup can be replaced at any time to match the sofa for decorative purposes.

The control panel is disposed separately from the cup holder. In some examples, the control panel includes a circuit board and a button placed on the circuit board. In some examples, the circuit board is placed on the upper surface of the light guide plate, and the circuit board and the light guide plate are fixed on the supporting body. The button protrudes from the button pocket hole, thereby protecting the control panel from damages and dust. The control panel may include one or more control buttons, and the control panel 1 may be programmable to switch between different control modes.

In some examples, when the control panel and the cup holder are installed on an adjustable sofa unit, the control panel 1 may be programmed to control the conversion between different sofa positions. The control buttons may be wired to connect with the reclining mechanism of the sofa, and may control the sofa to convert between a sitting position and various reclining positions. In some other examples, the control panel 1 may also be programmed to control the operations of the lighting provided in some examples of the cup holder, and such control assembly 4 can also be disconnected from controlling the lights pursuant to the needs of users. One of the control buttons may be wired to the control the state (on/off) of the light source that is connected to the cup holder. The light source may be disposed inside the cup holder, or the light source may also be external and electrically connected to the cup holder. The control buttons may be disconnected from the light source through a pre-programmed circuit or changed wirings, and the control buttons that are connected with the light sources may be switched to control the conversions of the sofa based on the user's needs.

In some examples, a USB port is further placed on the control panel 1. The USB port is fixed on the front side of the panel body, and the panel body has a USB pocket hole. Thus, Mobile phones, computers, etc. can be charged through the USB port. In some other examples, the control panel may also have an audio port for connecting to an external audio device, and the USB port and the audio port can be placed separately or together. Multiple USB ports and audio ports may also be provided based on the needs of users.

The cup holder also includes an inner cup, and the inner cup is detachably installed in the cup body. The inner cup is placed inside the cup body, and is designed to hold cups and cans of various sizes. Specifically, the inner cup is approximately cylindrical, and the inner cup can be installed in the cup body with a clearance fit. As a result, canned drinks and the like can be placed on the inner cup for the ease of cleaning and moisture resistance. The inner cup can also be used as an ashtray. At the same time, the inner cup can be replaced at any time to match the sofa for decorative purposes. In some examples, the inner cup is integrated with the cup body as one piece; while in some other examples, the inner cup can be easily removed from the cup body and the cup holder. The removable inner cup may allow users to clean the cup holder more easily, and the users may replace the inner cup itself without uninstall the whole cup holder.

In some examples according to the present disclosure, the extendable seat includes a seat body with an armrest, a powered reclining mechanism, and a control panel disposed on the armrest as disclosed in accordance with other examples. The control panel further includes a plurality of buttons operatively connected to the powered reclining mechanism of the extendable seat, wherein the plurality of buttons are configured to control the powered reclining mechanism of the extendable seat to move among different positions; a light switch button operatively connected with a light source, wherein the light source is disposed inside a cupholder that is placed on the armrest on the extendable seat, and the light switch button is configured to control the light source; a power supply port, wherein the power supply port is configured to provide power to an external electronic device; a panel body comprising two sides, wherein a first side of the panel body is fixedly attached to the armrest of the extendable seat, a second side of the panel body is opposite to the first side of the panel body, and the plurality of buttons, the light switch button and the power supply port are disposed on the second side of the panel body; and a circuit board disposed in the panel body, wherein the circuit board is electronically connected with the plurality of buttons, the light switch and the power supply port; wherein the control panel is disposed on the armrest of the extendable seat next to the cupholder separately, and the control panel is electronically connected to the cupholder, and one side of the control panel is curved to accommodate circumference of the cupholder.

In some examples, the extendable seat may further include one control button wired to move the powered reclining mechanism of the extendable seat between a fully reclined position and an upright sitting position.

In some examples, the extendable seat may further include a first group of buttons connected to control a backrest and a footrest of the extendable seat to move among different positions; and a second group of buttons to control a headrest of the extendable seat to move among different positions.

In some examples, the extendable seat may further include a connection port for connecting an external electronic device, wherein the plurality of buttons are configured to control operations of the external electronic device that is connected through the connection port.

In some examples, the extendable seat may further include a LED display to show a position of the extendable seat, adjustment options for the extendable seat, adjustment options for the cupholder, or adjustment options for the external electronic device that is connected to the control panel.

In summary, the control panel and the multifunctional cup holder provided by the present disclosure may possess the following effects:

1) By installing the control panel separately next to the cup holder, a user can not only put cans of drinks on the cup holder, but also adjust the position of the sofa to a comfortable state according to personal needs, which offers convenience and flexibility. Meanwhile, the control panel and the cup holder are designed as two separate bodies, which eases the installation and removal of the cup holder and the control panel on the sofa.
2) A user can charge mobile phones, computers, etc., and connect audio devices to the sofa through USB ports and audio ports.
3) The light source in the cup holder can be used as an external light source to emit light, so that the user can find the cup holder and the control panel in a dark environment.

The present disclosure may include dedicated hardware implementations such as application specific integrated circuits and other hardware devices. The hardware implementations can be constructed to implement one or more of the methods described herein. Examples that may include the apparatus and systems of various implementations can broadly include a variety of mechanical systems. One or more examples described herein may implement functions using two or more specific interconnected hardware devices or units with related control and data signals that can be communicated between and through the units, or as portions of the device. Accordingly, the apparatus or system disclosed may encompass software and hardware implementations. The terms "circuit," "sub-circuit," "unit," or "subunit" may include memory (shared, dedicated, or group) that stores code or instructions that can be executed. The unit or circuit may include one or more components that are connected.

The above examples of the present disclosure focus on the differences among various examples, and the different optimization features among the various examples can be combined to form a better example as long as they are not contradictory, which will not be detailed here for brevity concern.

The above-described are only examples of the present disclosure, and are not used to limit the present disclosure. For those skilled in the art, various modifications and variations are possible. Any modification, equivalent substitution, improvement, and others made within the spirit and principle of the present disclosure shall be included within the scope the present disclosure.

The invention claimed is:

1. A control panel, comprising:

a plurality of buttons operatively connected to a powered reclining mechanism of an extendable seat, wherein the plurality of buttons are configured to control the powered reclining mechanism of the extendable seat to move among different positions;

a light switch button operatively connected with a light source, wherein the light source is disposed inside a cupholder that is placed on an armrest on the extendable seat, and the light switch button is configured to control the light source;

a power supply port, wherein the power supply port is configured to provide power to an external electronic device;

a panel body comprising two sides, wherein a first side of the panel body is fixedly attached to the armrest of the extendable seat, a second side of the panel body is opposite to the first side of the panel body, and the plurality of buttons, the light switch button and the power supply port are disposed on the second side of the panel body, wherein the panel body has a trapezoid shape having an upper base and a bottom base, the upper base is closer to the cupholder than the bottom base, and the upper base of the panel body is of a concave curve that conforms to a circumference of the cupholder, and wherein the power supply port is placed close to the upper base of the panel body, at least one of the plurality of buttons are placed along the bottom base of the panel body, and the light switch button is placed in a central area of the panel body and is surrounded by the plurality of buttons; and a circuit board disposed in the panel body, wherein the circuit board is electronically connected with the plurality of buttons, the light switch button and the power supply port;

wherein the control panel is disposed on the armrest of the extendable seat next to the cupholder separately, and the control panel is electronically connected to the cupholder, and one side of the control panel is curved to accommodate the circumference of the cupholder.

2. The control panel of claim 1, wherein the plurality of buttons comprises one control button wired to move the powered reclining mechanism of the extendable seat between a fully reclined position and an upright sitting position.

3. The control panel of claim 1, wherein the plurality of buttons comprises a first group of buttons connected to control a backrest and a footrest of the extendable seat to move among different positions.

4. The control panel of claim 1, wherein the plurality of buttons comprises a second group of buttons to control a headrest of the extendable seat to move among different positions.

5. The control panel of claim 1, wherein the power supply port comprises a USB port, a USB-C port, or a lightning port for connecting the external electronic device.

6. The control panel of claim 1, wherein the control panel is connected with the cupholder wirelessly or with wires to control operations of the cupholder.

7. The control panel of claim 1, wherein the power supply port is configured to connect to the external electronic device, wherein the plurality of buttons are configured to control operations of the external electronic device that is connected through the power supply port.

8. The control panel of claim 1, further comprising:

a LED display to show a position of the extendable seat, adjustment options for the extendable seat, adjustment options for the cupholder, or adjustment options for the external electronic device that is connected to the control panel.

9. An extendable seat, comprising:

a seat body with an armrest, a powered reclining mechanism, and a control panel disposed on the armrest, wherein the control panel further comprises:

a plurality of buttons operatively connected to the powered reclining mechanism of the extendable seat, wherein the plurality of buttons are configured to control the powered reclining mechanism of the extendable seat to move among different positions;

a light switch button operatively connected with a light source, wherein the light source is disposed inside a cupholder that is placed on the armrest on the extendable seat, and the light switch button is configured to control the light source;

a power supply port, wherein the power supply port is configured to provide power to an external electronic device;

a panel body comprising two sides, wherein a first side of the panel body is fixedly attached to the armrest of the extendable seat, a second side of the panel body is opposite to the first side of the panel body, and the plurality of buttons, the light switch button and the power supply port are disposed on the second side of the panel body, wherein the panel body has a trapezoid shape having an upper base and a bottom base, the upper base is closer to the cupholder than the bottom base, and the upper base of the panel body is of a concave curve that conforms to a circumference of the cupholder, and wherein the power supply port is placed close to the upper base of the panel body, at least one of the plurality of buttons are placed along the bottom base of the panel body, and the light switch button is placed in a central area of the panel body and is surrounded by the plurality of buttons; and a circuit board disposed in the panel body, wherein the circuit board is electronically connected with the plurality of buttons, the light switch and the power supply port;

wherein the control panel is disposed on the armrest of the extendable seat next to the cupholder separately, and the control panel is electronically connected to the cupholder, and one side of the control panel is curved to accommodate the circumference of the cupholder.

10. The extendable seat of claim 9, wherein the plurality of buttons comprises one control button wired to move the powered reclining mechanism of the extendable seat between a fully reclined position and an upright sitting position.

11. The extendable seat of claim 9, wherein the plurality of buttons comprises a first group of buttons connected to control a backrest and a footrest of the extendable seat to move among different positions; and wherein the plurality of buttons comprises a second group of buttons to control a headrest of the extendable seat to move among different positions.

12. The extendable seat of claim 9, wherein:

the power supply port is configured to connect to the external electronic device, wherein the plurality of buttons are configured to control operations of the external electronic device that is connected through the power supply port.

13. The extendable seat of claim 9, wherein the control panel further comprises:

a LED display to show a position of the extendable seat, adjustment options for the extendable seat, adjustment options for the cupholder, or adjustment options for the external electronic device that is connected to the control panel.

14. A method of manufacturing a control panel, comprising:

connecting a plurality of buttons operatively to a powered reclining mechanism of an extendable seat, wherein the plurality of buttons are configured to control the powered reclining mechanism of the extendable seat to move among different positions;

connecting a light switch button operatively with a light source, wherein the light source is disposed inside a cupholder that is placed on an armrest on the extendable seat, and the light switch button is configured to control the light source;

providing a power supply port, wherein the power supply port is configured to provide power to an external electronic device;

providing a panel body comprising two sides, and fixedly attaching a first side of the panel body to the armrest of the extendable seat, wherein a second side of the panel body is opposite to the first side of the panel body, and the plurality of buttons, the light switch button and the power supply port are disposed on the second side of the panel body, wherein the panel body has a trapezoid shape having an upper base and a bottom base, the upper base is closer to the cupholder than the bottom base, and the upper base of the panel body is of a concave curve that conforms to a circumference of the cupholder, and wherein the power supply port is placed close to the upper base of the panel body, at least one of the plurality of buttons are placed along the bottom base of the panel body, and the light switch button is placed in a central area of the panel body and is surrounded by the plurality of buttons; and placing a circuit board in the panel body, and electronically connecting the circuit board with the plurality of buttons, the light switch and the power supply port;

wherein the control panel is disposed on the armrest of the extendable seat next to the cupholder separately, and the control panel is electronically connected to the cupholder, and one side of the control panel is curved to accommodate the circumference of the cupholder.

15. The method of manufacturing a control panel of claim 14, further comprising:

providing one control button operatively connected to move the powered reclining mechanism of the extendable seat between a fully reclined position and an upright sitting position.

16. The method of manufacturing a control panel of claim 14, further comprising:

providing a first group of buttons operatively connected to control a backrest and a footrest of the extendable seat to move among different positions; and providing a second group of buttons operatively connected to control a headrest of the extendable seat to move among different positions.

17. The method of manufacturing a control panel of claim 14, further comprising:

providing the power supply port for connecting the external electronic device, wherein the plurality of buttons are configured to control operations of the external electronic device that is connected through the power supply port.

18. The method of manufacturing a control panel of claim 14, further comprising:

providing a LED display to show a position of the extendable seat, adjustment options for the extendable seat, adjustment options for the cupholder, or adjustment options for the external electronic device that is connected to the control panel.

* * * * *